United States Patent [19]

Uesugi et al.

[11] Patent Number: 5,013,399

[45] Date of Patent: May 7, 1991

[54] METHOD OF PREPARING SUPPORT FOR LITHOGRAPHIC PRINTING PLATE

[75] Inventors: Akio Uesugi; Tsutomu Kakei; Shinichiro Minato, all of Shizuoka, Japan

[73] Assignee: Fuji Photo Film Co., Ltd., Kanagawa, Japan

[21] Appl. No.: 422,312

[22] Filed: Oct. 16, 1989

Related U.S. Application Data

[63] Continuation of Ser. No. 146,868, Jan. 22, 1988, abandoned.

[30] Foreign Application Priority Data

| | | | |
|---|---|---|---|
| Jan. 22, 1987 | [JP] | Japan | 62-11367 |
| Feb. 17, 1987 | [JP] | Japan | 62-28347 |

[51] Int. Cl.[5] .......... C23F 1/00; B44C 1/22; B05D 3/06; B23K 26/00

[52] U.S. Cl. .......... 156/643; 156/656; 156/665; 427/53.1; 219/121.69

[58] Field of Search .......... 427/53.1; 156/643, 656, 156/665; 219/121.69; 204/192.35

[56] References Cited

U.S. PATENT DOCUMENTS

| | | | |
|---|---|---|---|
| 4,490,211 | 12/1984 | Chen et al. | 427/531 |
| 4,518,456 | 5/1985 | Bjorkholm | 156/643 |
| 4,618,398 | 10/1986 | Nawata et al. | 156/643 |
| 4,622,095 | 11/1986 | Grobman et al. | 427/53.1 |
| 4,724,219 | 2/1988 | Ridinger | 156/643 |
| 4,766,009 | 8/1988 | Imura et al. | 427/53.1 |
| 4,851,091 | 7/1989 | Uesugi et al. | 204/129.46 |
| 4,872,946 | 10/1989 | Uesugi et al. | 156/637 |
| 4,909,894 | 3/1990 | Uesugi et al. | 156/640 |

FOREIGN PATENT DOCUMENTS 00204538 12/1986 European Pat. Off. .

*Primary Examiner*—Norman Morgenstern
*Assistant Examiner*—Marianne Padgett
*Attorney, Agent, or Firm*—Sughrue, Mion, Zinn, Macpeak & Seas

[57] ABSTRACT

A method of preparing a support for a lithographic printing plate is described, which comprises roughening the support surface by laser irradiation performed under the condition that the support is placed in a liquid or in a gaseous atmosphere, thereby achieving improved stain resistance upon printing and excellent printing press life.

5 Claims, No Drawings

METHOD OF PREPARING SUPPORT FOR LITHOGRAPHIC PRINTING PLATE

This is a continuation of application Ser. No. 07/146,868 filed Jan. 22, 1988, now abandoned.

FIELD OF THE INVENTION

The present invention relates to a method of preparing a support for a lithographic printing plate, and, more particularly, to a method of graining the surface of an aluminum plate as the support.

BACKGROUND OF THE INVENTION

A so-called PS plate (Presensitized Printing Plate), which comprises an aluminum plate having a photosensitive composition coated thereon in a layer structure, has been known as a type of lithographic plate. A surface of the aluminum plate is roughened using various kinds of methods. After the surface roughening process, the aluminum plate is etched with an acidic or alkaline solution, further subjected to an anodic oxidation processing, and optionally receives such a treatment as to render the surface thereof hydrophilic. The thus processed aluminum plate is used as the support of a lithographic plate. On this support is provided a photosensitive layer to prepare a presensitized or PS plate. The PS plate is subjected to electromagnetic radiation exposure, development, correction, gumming-up and other process steps to be converted into a printing plate. The printing plate is set up in a press, and printing is performed.

The following methods for processing the surface of the aluminum plate have been conventionally known mechanical surface-roughening methods, such as ball graining, wire graining, brush graining, liquid honing, etc.; electrochemical methods, referred to as electrolytic graining methods; chemical methods; and combinations of two or more of such surface-roughening methods. However, these conventional methods have their respective, unsolved problems as described below.

In the case of the ball graining method, an especially high level of skill is required in selecting the kind, quality, and size of balls to be used, controlling the quantity of water to be used during graining, choosing the graining time, choosing the graining conditions by evaluating the condition of the finished-up surface such as a grain shape, uniformity of grains, etc., and so on. Furthermore, the productivity is remarkably low, particularly because the batch method is employed therein.

According to the wire graining method, the grain formed on the surface of an aluminum plate lacks uniformity. On the other hand, when the brush graining method is employed, problems arise such as that great roughness cannot be obtained at the grained surface, and the degree of roughness tends to vary with the graining time because of the abrasion loss of the graining brush used. In addition, the aluminum surface is scratched complexly through strong rubbing of the brush end and abrasives thereagainst to result in formation of a considerable number of sharp bar-like projections. It is attributable to these projection that some of the photosensitive layer remains in the areas intended to be removed upon development of the PS plate, to thus cause the staining of the plate surface, and aluminum plates are liable to receive scratches at their surfaces through casual rubbing of one processed face (roughened face) with another processed face upon handling thereof.

In the case of liquid honing, a slurry obtained by dispersing fine abrasive powders into a liquid is blown acceleratively against an aluminum plate by compressed air or the like. Therefore, the fine abrasive powders tend to stick into the aluminum plate to form burs. Further, the impact power of the slurry on the aluminum plate is too weak to roughen the plate surface to a sufficient extent in some cases. Furthermore, this method has another problem that the nozzle for projecting the slurry tends to be worth away in a short period of time due to the accelerative spurt of the slurry.

In the electrochemical surface-roughening method, the regulation of electrolysis conditions must be carried out with high precision in order to obtain regular graining at the roughened surface, the consumption of electric power is significant, and the waste solution containing Al ions, which remains and accumulates in the electrolytic solution, is disposed of at great cost.

In the case of chemical surface-roughening method, it takes a long time to achieve the treatment, so this method is not well suited to mass production. Further, a great cost is required for the waste disposal, as in the case of the above-described method. In this respect also, it is not well suited for mass production.

As surface-roughening methods which solve part of the above-described points to acquire suitability for mass production, there are disclosed a combined surface-roughening method, in which a brush or wire graining process is combined with an electrolytic graining process (e.g., in Japanese Patent Application (OPI) No. 63902/79 (the term "OPI" as used herein means an "unexamined published application")), and a combined surface-roughening method in which a liquid honing process is combined with an electrolytic graining process (e.g., in Japanese Patent Application (OPI) No. 19593/85). However, even these methods still have problems, such as that they cannot prevent stains from generating during printing, and are insufficient in press life.

In addition, there are disclosed the methods of graining with a slurry accelerated using high pressure water (in, e.g., Japanese Patent Application (OPI) No. 214697/84 corresponding to U.S. Pat. No. 4,613,413) as those which aim at the solution of the foregoing points, that is to say, to have suitability for mass production, to prevent stains from generating upon printing, and to ensure excellent printing press life.

However, the above-described method, in which the graining is carried out using slurry accelerated with high pressure water, still has a problem that it is necessary to circulate large quantities of slurry water and high pressure water.

SUMMARY OF THE INVENTION

An object of the present invention is to provide a method of preparing a support for a lithographic plate using such a graining process as not to have the defects from which the above-described graining processes suffer, to be carried out in a dry condition, and to ensure the prevention of stain generation and excellent printing press life.

As a result of concentrating our efforts on achievement of the above-described objects, a method has now been found which achieves these objects.

That is, the present invention comprises a method of preparing a support for a lithographic plate, comprising placing the support in a liquid or in a gaseous atmosphere in irradiating the support with laser radiation to render the surface thereof rough.

DETAILED DESCRIPTION OF THE INVENTION

As a support for a lithographic plate, a plate having a property of moisture retention is preferably employed, and an aluminum plate is more preferably employed in the present invention. Usable materials for the aluminum plate include pure aluminum and aluminum alloys. Suitable examples of such alloys include those containing aluminum as the main component, and trace amounts of silicon, copper, iron, manganese, magnesium, chromium, zinc, bismuth, nickel, etc. It is preferred in the aluminum plate that the aluminum content should be 99.0 wt% or above.

The method of roughening an aluminum plate is described in detail below. However, the present invention is not limited to an aluminum plate alone, but applicable to zinc, iron and other metal sheets (plates) also.

Aluminum plates made of the above-described materials have, in general, a rectangular shape in connection with a printing machine in which they are typically intended to be used for lithographic plates. In the present invention, the aluminum plate has a form of web (sheet), particularly on the scale of mass production, before cutting into rectangular pieces, and the shape thereof can be selected properly. The thickness of the aluminum plate is chosen appropriately from the practical range of from 0.1 to 0.5 mm in consideration of tensile strength, abrasion resistance, extension, bending strength, etc., which are necessitated in mounting the resulting lithographic plate on a printing machine.

Various kinds of lasers, such as $CO_2$ laser, yttrium-aluminum-garnet (YAG) laser, ruby laser, etc., be used for irradiation in accordance with the present invention. From these lasers, an appropriate one should be selected depending on the kind of a support to be used, the shape of grains to be formed, and so on. For instance, lasers of shorter wavelengths, such as a YAG laser, are suitable for an aluminum plate. YAG laser is one which provides the largest continuous power output in solid lasers. In crystalline matrix, neodium ion ($Nd^{3+}$) is doped to YAG in an amount of 0.73 wt%. Wavelength of YAG laser is 1.06 $\mu$m. Irradiation energy, within the general range of from $1\times10^{-5}$ J/mm$^2$ to $1\times10^{5}$ J/mm$^2$, can be appropriately determined depending on the quality of the support employed, the focal distance, the beam diameter, the kind of laser used, and so on. Furthermore, the scanning speed of the laser beam, etc., can be appropriately varied depending on the traveling speed and the size of the support.

The irradiation with laser in the present invention is carried out in the condition that the support is placed in a gaseous atmosphere, if desired, under vacuum, or in a liquid. As a liquid to envelop the support therein, industrial water is firstly cited. Also, an acidic or alkaline solution can be used, depending on the desired graining characteristics. By the irradiation in an acidic or alkaline solution, thin pits which are obtained by a chemical reaction with the acidic or alkaline solution are produced in pits obtained using laser. In addition, the laser irradiation may be performed in an electrochemical processing solution. When the support to be irradiated is thin, for example, 0.5 mm or less, especially 0.2 mm or less, it is preferred that the laser irradiation should be carried out in a liquid, to minimize the possibility of deformation of the support due to evolution of heat.

Moreover, the thus roughened surface of the support can be subjected to an electrochemical graining process, or to a chemical etching process and then to an electrochemical graining process to form electrochemical graining on the etched surface. When it is intended to grain uniformly using an electrochemical graining process as described hereinafter, it is more desirable to conduct in advance the chemical etching process. In addition to alkalis, the etching may be carried out using acidic solutions capable of eroding aluminum (e.g., hydrofluoric acid, phosphoric acid, sulfuric acid, etc.). Suitable alkali agents which can be used include sodium hydroxide, potassium hydroxide, sodium metasilicate, sodium carbonate, sodium aluminate, sodium gluconate, and so on. It is adequate for effecting the chemical etching to choose a concentration of the range of from 1 to 50 wt%, a temperature from the range of ordinary room temperature (about 18° C.) to 90° C., and a time from the range of from 5 seconds to 5 minutes. More specifically, it is preferable to choose them so that a quantity of the etched aluminum may come within the range of 0.1 to 10 g/m$^2$.

On the surface of the aluminum plate which has received an alkali etching treatment as described above, alkali-insoluble substances (or smut) remains, and hence a desmutting treatment is desirably carried out with an acidic solution (e.g., a solution containing $HNO_3$, $H_2SO_4$, $H_3PO_4$, or the like).

Subsequently, the surface of the aluminum plate is roughened electrochemically. Electrolytic solutions which can be preferably used include hydrochloric acid, nitric acid, or a mixture thereof. The electrolysis is carried out using direct current or alternating current in a 0.1 to 10 wt%, preferably 0.3 to 3 wt%, acid solution. A secondary rough surface depending on the quantity of electricity used for electrolysis is formed at the surface of the aluminum plate. The pit depth of the secondary grains ranges from 0.1 to 1 micron, preferably from 0.1 to 0.8 micron, and the pit diameter thereof ranges from 0.1 to 5 microns, preferably from 0.1 to 3 microns.

In order to obtain a pit diameter as described above, it is advantageous to employ special alternating waveforms as described, e.g., in Japanese Patent Publication Nos. 19280/81 and 19191/80. Namely, the secondary grains can be formed economically and uniformly by controlling the electrolysis waveform. Also, amines, gluconic acid, boric acid, phosphoric acid, hydrofluoric acid and the like can be added to an electrolytic solution to obtain uniform honeycombed pits, as disclosed in U.S. Pat. Nos. 3,963,564 and 3,980,539, and so on.

Subsequently, the aluminum plate having the secondary grains formed at the surface is preferably treated with an acid or alkali solution. More specifically, not only sulfuric acid described in Japanese Patent Publication No. 11316/81, but also phosphoric acid or a mixture of phosphoric acid and chromic acid can be used. As described in Japanese Patent Publication No. 28123/73, on the other hand, light etching so as to etch preferably 1 g/in$^2$ or less, and more preferably 0.5 g/in$^2$ or less of the plate is carried out with an alkaline solution such as sodium hydroxide solution to remove smut adhering to the surface. When the sticked smut is removed with an alkali solution, the aluminum surface is etched, and thereby alkali-insoluble components remain on the surface. Therefore, it is necessary to desmut again with an acidic solution (e.g., sulfuric acid, phosphoric acid, chromic acid, etc.).

The present invention may also comprise forming primary grains by accelerating a slurry with the aid of high pressure water against a support roughened in accordance with the present invention, and thereafter modifying the grain shape using a brush graining process, if desired.

Furthermore, an interlayer or an anodic oxidation film may be formed on the processed aluminum surface according to circumstances for the purposes of preserving the keeping stability of a diazo compound contained in a light-sensitive layer, improving adhesiveness to a light-sensitive layer, improving the printing press life, and so on.

This step can also be applied to the support which has the foregoing electrochemical grains formed on the roughened surface.

The term interlayer as used herein is intended to include a silicate layer prepared by a dipping process utilizing the silicate of an alkali metal, e.g., sodium silicate, and a hydrophilic subbing layer made up of, e.g., CMC, PVA, etc., as described in U.S. Pat. Nos. 2,714,066 and 3,181,461. Examples of the electrolytic solution to be used for forming an anodic oxidation film include not only sulfuric acid, but also phosphoric acid, chromic acid, oxalic acid, benzenesulfonic acid, etc.

A preferred coverage of the anodic oxidation film ranges from 0.1 to 10 g/m$^2$, and more preferably from 0.3 to 5 g/m$^2$. A desirable result can be obtained by conducting alkali etching and desmutting treatments prior to the anodic oxidation.

The condition of the anodic oxidation process cannot be absolutely determined, because it undergoes various changes depending on the electrolytic solution used. In general, a suitable concentration of the electrolytic solution ranges from 1 to 80 wt%, a suitable temperature thereof ranges from 5 to 70° C., a suitable current density therein ranges from 0.5 to 60 A/$\alpha m^2$, a suitable voltage ranges from 1 to 100 V, and a suitable electrolysis time ranges from 10 seconds to 5 minutes.

As the grained aluminum plate with the thus obtained anodic oxidation film is stable and excellent in hydrophilic property by itself, a light-sensitive coat can be provided directly thereon. However, additional surface treatments may be conducted, if desired. For instance, a silicate layer made up of the silicate of an alkali metal, or a subbing layer made up of a hydrophilic high polymer, as described hereinbefore, can be provided. The coverage of the subbing layer preferably ranges from 5 to 150 mg/m$^2$.

A light-sensitive coat is provided on the thus processed aluminum support, subjected successively to imagewise exposure and development to produce a printing plate, and set up in a printing machine, followed by the start of printing.

The following are non-limiting examples of the method of the invention.

EXAMPLE 1

A plate of JIS 1050 aluminum was irradiated in an air atmosphere with a YAG laser of 0.3 J/mm$^2$ to roughen the plate surface. According to the observation of the irradiated surface of the aluminum plate with electron micrographs, no burs were found, the roughness was very gentle , and the grain was uniform. The mean roughness of the thus obtained aluminum-plate surface was 0.5 micron. The mean roughness was obtained by measuring a mean height of grains by scanning the surface of aluminum using a diamond needle having 2 μm of diameter.

Then, the aluminum plate was soaked in a 15 wt% water solution of sulfuric acid (kept at a temperature of 30° C.), and subjected to 60 seconds' anodic oxidation under the condition that the electrodes were placed at a distance of 150 mm, and direct current was passed therebetween at a voltage of 22 V. Further, the resulting plate was dipped in a 2 wt% water solution of JIS 3 sodium silicate (bath temperature: 70° C.) for 30 seconds, washed with water, and then dried. On the thus processed aluminum-plate surface, the p-toluenesulfonic acid salt of the 1/1 condensate of p-diazodiphenylamine and formaldehyde was coated as a light-sensitive component at a dry coverage of 1.8 g/m$^2$, and dried. The thus obtained presensitized plate was designated Sample A.

COMPARATIVE EXAMPLE 1

A slurry in which an alumina abrasive having a mean particle size of 120 microns was suspended was made to join a water flow jetted from a nozzle at a pressure of 30 kg/cm$^2$, made to strike against the plate surface of the same JIS 1050 aluminum as used in Example 1 at an angle of 45° to the plate surface. Thus, the uniformly grained surface with a mean roughness of 0.6 micron was formed.

The thus processed surface of the aluminum plate was observed with electron micrographs as in Example 1, and a shallow grain pattern with relatively short periodicity was seen to be present on the surface.

Then, the aluminum plate was subjected to anodic oxidation treatment in the same manner as in Example 1, and thereon was coated and dried the same light-sensitive component as used in Example 1. The thus obtained presensitized plate was designated Sample B.

After exposure and subsequent development, Samples A and B were used for printing according to general steps. The results obtained are shown in Table 1.

TABLE 1

| Plate | A | B |
|---|---|---|
| Printing Impression | 100,000 sheets | 100,000 sheets |
| Stain Resistance | Very Excellent | Excellent |

As can be seen from the results shown in Table 1, Sample A produced in accordance with the present invention was more stain resistant during printing than Sample B produced according to a conventional method. Both samples had such excellent printing press life as to provide 100,000 sheets of clear prints.

EXAMPLE 2

A plate of JIS 1050 aluminum was placed in water, and irradiated with YAG laser of 0.3 J/mm$^2$ to roughen the plate surface. According to the observation of the irradiated surface of the aluminum plate with electron micrographs, no burs were found, the roughness was very gentle, and the grain was uniform. The mean roughness of the thus obtained aluminum-plate surface was 0.4 micron, which was finer than that obtained by laser irradiation in the dry condition.

Then, in analogy with the treatments in Example 1, the irradiated aluminum plate was subjected to anodic oxidation using a 15 wt% water solution of sulfuric acid, treated with JIS 3 sodium silicate, coated with the p-toluenesulfonic acid salt of the 1:1 condensate of p-diazodiphenylamine and formaldehyde, and dried. The thus obtained presensitized plate was designated Sample C.

COMPARATIVE EXAMPLE 2

A slurry in which an alumina abrasive having a mean particle size of 120 microns was suspended was made to join a water flow jetted from a nozzle at a pressure of 30 $kg/cm^2$, and made to strike against the plate surface of the same JIS 1050 aluminum as used in Example 2 with an angle of 45° to the plate surface. Thus, the uniformly grained surface with a mean roughness of 0.6 micron was formed.

So far as the thus processed surface of the aluminum plate was observed with electron micrographs similarly to the foregoing examples, shallow grain with relatively short periodicity was present on the surface.

Then, the aluminum plate was subjected to anodic oxidation treatment in the same manner as in Example 2, coated with the same light-sensitive component as used in Example 2, and dried. The thus obtained presensitized plate was designated Sample D.

After exposure and subsequent development, Samples C and D were used for printing according to general steps. The results obtained are shown in Table 2.

TABLE 2

| Plate | C | D |
|---|---|---|
| Printing Press Life | 100,000 sheets | 100,000 sheets |
| Stain Resistance | Very Excellent | Excellent |

As can be seen from the data in Table 2, Sample C produced in accordance with the present invention had improved stain resistance upon printing, compared with Sample D produced using a conventional method. Both samples demonstrated such excellent printing impression as to provide 100,000 sheets of clear prints.

Moreover, deformation of the support due to evolution of heat through laser irradiation was not observed in Sample C, and the roughness obtained in Sample C was finer than that in Sample A which had undergone laser irradiation in the dry condition.

In accordance with a preferred embodiment of the roughening comprising irradiating a support of a lithographic plate with laser in such a condition that the support is placed in a liquid or in a gaseous atmosphere, the deformation of the support due to heat was prevented, fine roughness was formed at the support surface, an improvement in stain resistance upon printing was attained, and excellent printing press life was obtained, whereby achieving an improvement in quality of printed matter, and reduction of production cost.

In addition, stains on the support surface and a degenerated layer can be removed at one time by performing in a liquid the irradiation of a support with laser energy, and both support and surrounding liquid are activated at the interface therebetween by the irradiation with laser to result in the formation of still finer grain.

While the invention has been described in detail and with reference to specific embodiments thereof, it will be apparent to one skilled in the art that various changes and modification can be made therein without departing from the spirit and scope thereof.

We claim:

1. A method of preparing an aluminum or aluminum alloy support for a lithographic printing plate, comprising placing an aluminum or an aluminum alloy support in an acidic or alkaline solution and irradiating the support while in the solution with laser radiation to render the surface thereof rough, said surface roughness comprising thin pits within larger pits wherein said thin pits are produced by a laser activated chemical reaction with the acidic or alkaline solution and said larger pits are produced by direct laser irradiation.

2. A method of preparing a support for a lithographic printing plate as in claim 1, wherein said plate has an aluminum content of 99.0 wt% or more.

3. A method of preparing a support for a lithographic printing plate as in claim 1, wherein said laser radiation is provided by a $C_2$ laser, a yttrium-aluminum-garnet (YAG) laser, or a ruby laser.

4. A method -of preparing a support for a lithographic printing plate as in claim 1, wherein the irradiation is carried out with an irradiation energy of from $1\times10^{-5}$ J/mm$^2$ to $1\times10^{5}$ J/mm$^2$.

5. A method of preparing a support for a lithographic printing plate as in claim 1, wherein said laser radiation is provided by a yttrium-aluminum-garnet (YAG) laser.

* * * * *